(12) United States Patent
Do et al.

(10) Patent No.: US 10,693,195 B2
(45) Date of Patent: Jun. 23, 2020

(54) RECHARGEABLE BATTERY

(71) Applicant: LG CHEM, LTD., Seoul (KR)

(72) Inventors: Jin Uk Do, Daejeon (KR); Ju Bin Kim, Daejeon (KR); Sang Sok Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 105 days.

(21) Appl. No.: 15/023,873

(22) PCT Filed: Nov. 4, 2015

(86) PCT No.: PCT/KR2015/011774
§ 371 (c)(1),
(2) Date: Mar. 22, 2016

(87) PCT Pub. No.: WO2016/129777
PCT Pub. Date: Aug. 18, 2016

(65) Prior Publication Data
US 2016/0359201 A1    Dec. 8, 2016

(30) Foreign Application Priority Data
Feb. 13, 2015  (KR) .................. 10-2015-0022593

(51) Int. Cl.
*H01M 10/42*    (2006.01)
*H01M 2/02*    (2006.01)
*H01M 10/04*    (2006.01)

(52) U.S. Cl.
CPC ....... *H01M 10/4235* (2013.01); *H01M 2/024* (2013.01); *H01M 10/0431* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2006/0073380 A1* | 4/2006 | Kim | H01M 10/052 429/129 |
| 2009/0077794 A1 | 3/2009 | Hirakawa et al. | |
| 2011/0117414 A1* | 5/2011 | Choi | H01M 2/1606 429/144 |
| 2012/0115025 A1 | 5/2012 | Kim et al. | |

(Continued)

FOREIGN PATENT DOCUMENTS

| | | |
|---|---|---|
| CN | 101363834 A | 2/2009 |
| CN | 101601974 A | 12/2009 |

(Continued)

OTHER PUBLICATIONS

Extended European Search Report dated Nov. 23, 2016, for European Application No. 15841013.4.

*Primary Examiner* — Maria Laios
*Assistant Examiner* — Angela J Martin
(74) *Attorney, Agent, or Firm* — Birch, Stewart, Kolasch & Birch, LLP

(57) ABSTRACT

Provided is a rechargeable battery. The rechargeable battery includes an electrode assembly, an electrolyte immersing the electrode assembly therein, a case assembly accommodating the electrode assembly and the electrolyte, and an absorbing member disposed in the electrode assembly to absorb stress applied to the inside of the electrode assembly when the electrode assembly is expanded.

5 Claims, 8 Drawing Sheets

(56) References Cited

U.S. PATENT DOCUMENTS

| | | | |
|---|---|---|---|
| 2013/0280570 A1* | 10/2013 | Kim | ........................ H01M 2/10 |
| | | | 429/94 |
| 2013/0299064 A1 | 11/2013 | Kim et al. | |
| 2013/0305526 A1 | 11/2013 | Kim et al. | |
| 2013/0306221 A1 | 11/2013 | Kim et al. | |
| 2013/0316205 A1 | 11/2013 | Kim et al. | |
| 2014/0290829 A1* | 10/2014 | Kim | ........................ H01M 2/10 |
| | | | 156/83 |
| 2015/0147640 A1 | 5/2015 | Kim et al. | |

FOREIGN PATENT DOCUMENTS

| | | | | |
|---|---|---|---|---|
| CN | 102219904 A | | 10/2011 | |
| CN | 102489268 A | | 6/2012 | |
| JP | 6-333600 A | | 12/1994 | |
| JP | H06333600 | * | 12/1994 | ............ H01M 10/05 |
| JP | 2001-93578 A | | 4/2001 | |
| JP | 2006-80072 A | | 3/2006 | |
| JP | 2011-134634 A | | 7/2011 | |
| JP | 2012-185925 A | | 9/2012 | |
| JP | 2014-503978 A | | 2/2014 | |
| JP | 2014-508827 A | | 4/2014 | |
| KR | 1999-0031053 U | | 7/1999 | |
| KR | 10-0859637 A1 | | 9/2008 | |
| KR | 10-2009-0088761 A | | 8/2009 | |
| KR | 200900088761 A | * | 8/2009 | ............ H01M 10/04 |
| KR | 10-2010-0092700 A | | 8/2010 | |
| KR | 10-1198294 B1 | | 11/2012 | |
| KR | 10-1239622 B1 | | 3/2013 | |
| KR | 10-1375888 B1 | | 3/2014 | |
| KR | 101375888 | * | 3/2014 | ............ C09J 133/04 |
| WO | WO 2007/097172 A1 | | 8/2007 | |

* cited by examiner

RECHARGEABLE BATTERY

CROSS-REFERENCE TO RELATED APPLICATION

The present application claims the benefit of the priority of Korean Patent Application No. 2015-0022593, filed on Feb. 13, 2015, which is hereby incorporated by reference in its entirety.

TECHNICAL FIELD

The present invention relates to a rechargeable battery, and more particularly, to a rechargeable battery that is capable of absorbing stress applied to the inside of an electrode assembly when the electrode assembly is expanded.

BACKGROUND ART

In general, rechargeable batteries are being used as energy sources of electronic equipment. Particularly, rechargeable batteries are being used as power sources of electric vehicles (EVs), hybrid electric vehicles (HEVs), and the like.

In a cylindrical or prismatic type rechargeable battery of rechargeable batteries, a positive electrode, a separator, and a negative electrode are wound in a jelly-roll shape to manufacture an electrode assembly. The jelly-roll-type (winding type) electrode assembly is accommodated in a cylindrical or prismatic type case, and an electrolyte is injected into the case. Then, a top cap on which an electrode terminal is formed is coupled to an opened end of the case to assemble the rechargeable battery. Also, charging and aging are performed on the assembled cylindrical or prismatic type rechargeable battery to activate the electrode assembly that is in a discharged state.

DISCLOSURE OF THE INVENTION

Technical Problem

When the rechargeable battery according to the related art is charged and discharged, the electrode assembly may be expanded to generate stress to the inside and outside of the electrode assembly. Here, the stress applied to the outside of the electrode assembly may be expanded while pushing a can. However, the stress applied to the inside of the electrode assembly may cause twist of the electrode assembly due to no space. As a result, the rechargeable battery may be deteriorated in performance by the twisted electrode assembly.

In order to solve the foregoing limitations, an object of the present invention is to provide a rechargeable battery that absorbs stress applied to the inside of an electrode assembly when the electrode assembly is expanded to prevent the electrode assembly from being twisted, thereby preventing the rechargeable battery from being deteriorated in performance.

Technical Solution

According to an aspect of the present invention, there is provided a rechargeable battery including: an electrode assembly; an electrolyte immersing the electrode assembly therein; a case assembly accommodating the electrode assembly and the electrolyte; and an absorbing member disposed in the electrode assembly to absorb stress applied to the inside of the electrode assembly when the electrode assembly is expanded.

The absorbing member may be formed of a material that absorbs the electrolyte and is swelled. That is, the absorbing member may include a swelling tape, and the swelling tape may absorb the stress applied to the inside of the electrode assembly.

The absorbing member may be disposed in a winding center of the electrode assembly that is manufactured by winding a first electrode, a separator, and a second electrode in a jelly-roll shape.

The electrode assembly may have a cross-section having an oval shape to define a central space having an oval shape in the winding center, and the absorbing member may be attached to the central space.

The absorbing member may have a size that is less than or equal to that of the central space.

The rechargeable battery may further include a sealing tape disposed on an outer circumferential surface of the electrode assembly.

The sealing tape may be formed of a material that absorbs the electrolyte and is swelled.

The case assembly may be provided as a prismatic type can assembly.

The swelling tape may include a base layer deformed in a longitudinal direction when contacting the electrolyte and an adhesion layer disposed on one surface of the base layer.

The base layer may include at least one of a urethane-bonded compound, an ester-bonded compound, an ether-bonded compound, a cellulose ester compound.

Advantageous Effects

The present invention has effects as follows.

First: the absorbing member may be provided in the electrode assembly to absorb the stress applied to the inside of the electrode assembly when the electrode assembly is charged and discharged and prevent the deformation of the electrode assembly such as the twist of the electrode assembly from occurring, thereby preventing the rechargeable battery from being deteriorated in performance.

Second: since the swelling tape that is expanded by the electrolyte is used as the absorbing member, the absorbing member may be easily attached and expanded to the inside of the electrode assembly, and also, the stress applied to the inside of the electrode assembly may be stably absorbed.

Third: the absorbing member may be provided at the winding center of the electrode assembly that is wound in the jelly-roll shape to stably absorb the stress applied to the core at the outer circumferential surface of the electrode assembly.

Fourth: when the electrode assembly is wound, the space may be defined so that the absorbing member may be more easily inserted.

Fifth: the sealing tape attached to the outer circumferential surface of the electrode assembly may be formed of the material that absorbs the electrolyte and is swelled to absorb the stress applied to the outside of the electrode assembly.

Sixth: the swelling tape may include the base layer that is deformed in the longitudinal direction when contacting the electrolyte and the adhesion layer to achieve the attachment force by which the swelling tape is attached to the electrode assembly as well as the expansion force by which the swelling tape is swelled by the electrolyte.

BRIEF DESCRIPTION OF THE DRAWINGS

FIGS. 4 to 8 are views illustrating a method for manufacturing the rechargeable battery according to the present invention, wherein FIG. 4 is a view illustrating a manufactured state of the electrode assembly, FIG. 5 is a view illustrating a coupled state of an absorbing member, FIG. 6 is a view illustrating a coupled state of a sealing tape, FIG. 7 is a view illustrating a state in which an electrolyte and the electrode assembly are accommodated in a can assembly, and FIG. 8 is a view illustrating an expanded state of the electrode assembly when the rechargeable battery is charged and discharged.

MODE FOR CARRYING OUT THE INVENTION

Figure 1:
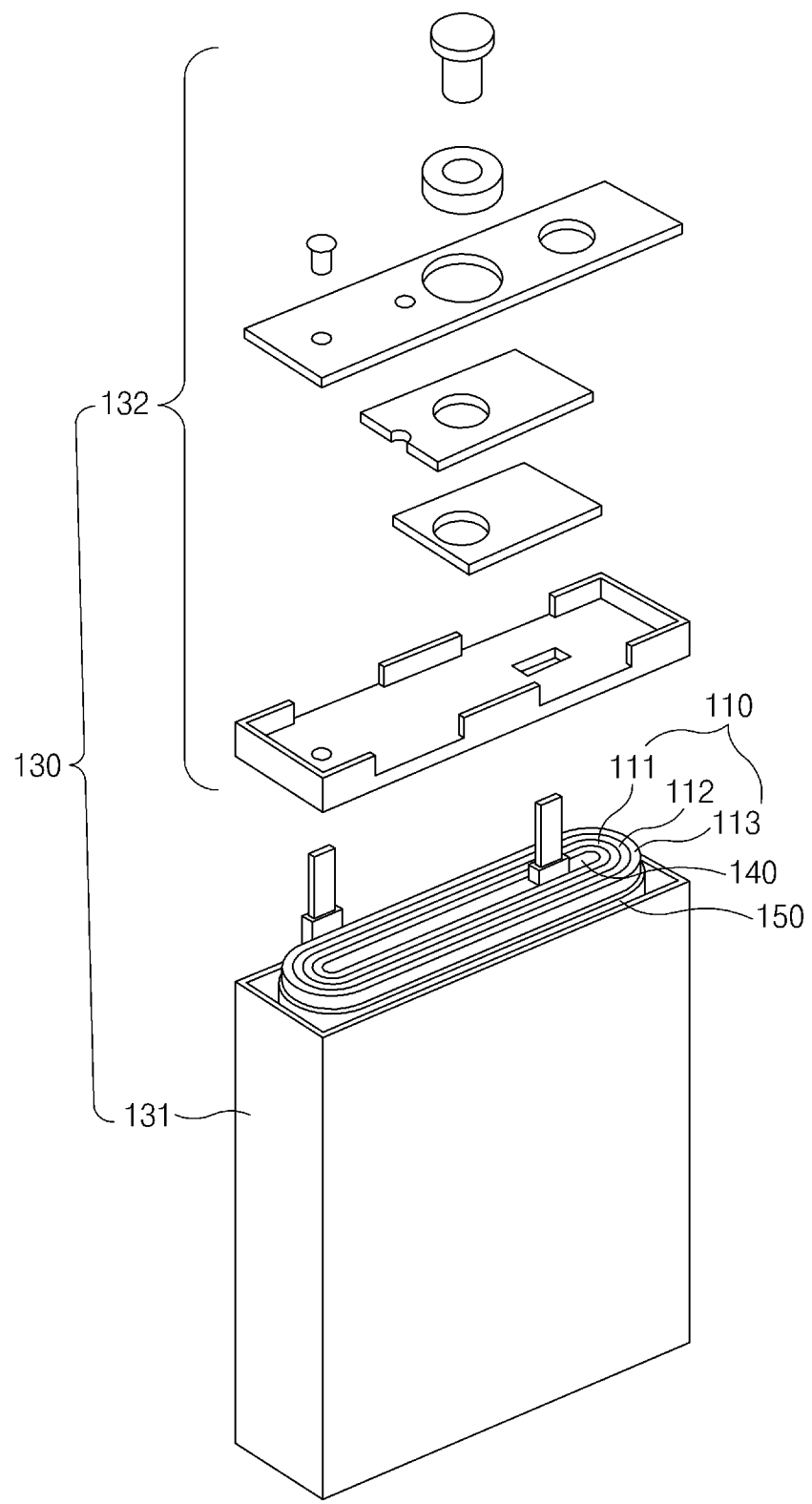
FIG. 1 is a perspective view of a rechargeable battery according to the present invention.

Hereinafter, preferred embodiments of the present invention will be described in detail with reference to the accompanying drawings in such a manner that the technical idea of the present invention may easily be carried out by a person with ordinary skill in the art to which the invention pertains. The present disclosure may, however, be embodied in different forms and should not be construed as limited to the embodiments set forth herein. In the drawings, anything unnecessary for describing the present disclosure will be omitted for clarity, and also like reference numerals in the drawings denote like elements.

Figure 2:
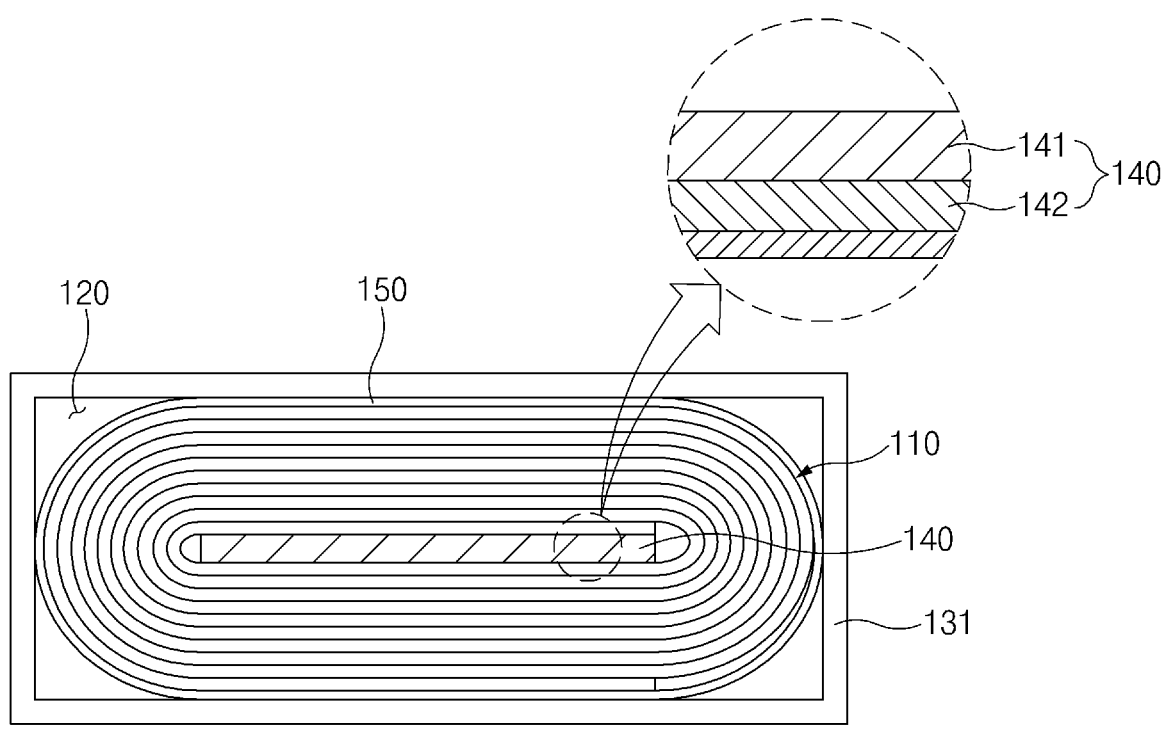
FIG. 2 is a side cross-sectional view of the rechargeable battery according to the present invention.

As illustrated in FIGS. 1 and 2, a rechargeable battery according to the present invention includes an electrode assembly 110, an electrolyte 120 in which the electrode assembly 110 is immersed, a case assembly 130 that accommodates the electrode assembly 110 and the electrolyte 120, and an absorbing member 140 provided in the electrode assembly 110. The absorbing member 140 may absorb stress applied to the inside of the electrode assembly 110 when the electrode assembly 110 is expanded to prevent the electrode assembly 110 from being twisted or deformed.

Hereinafter, constituents of the rechargeable battery according to the present invention will be described in more detail.

Figure 3:
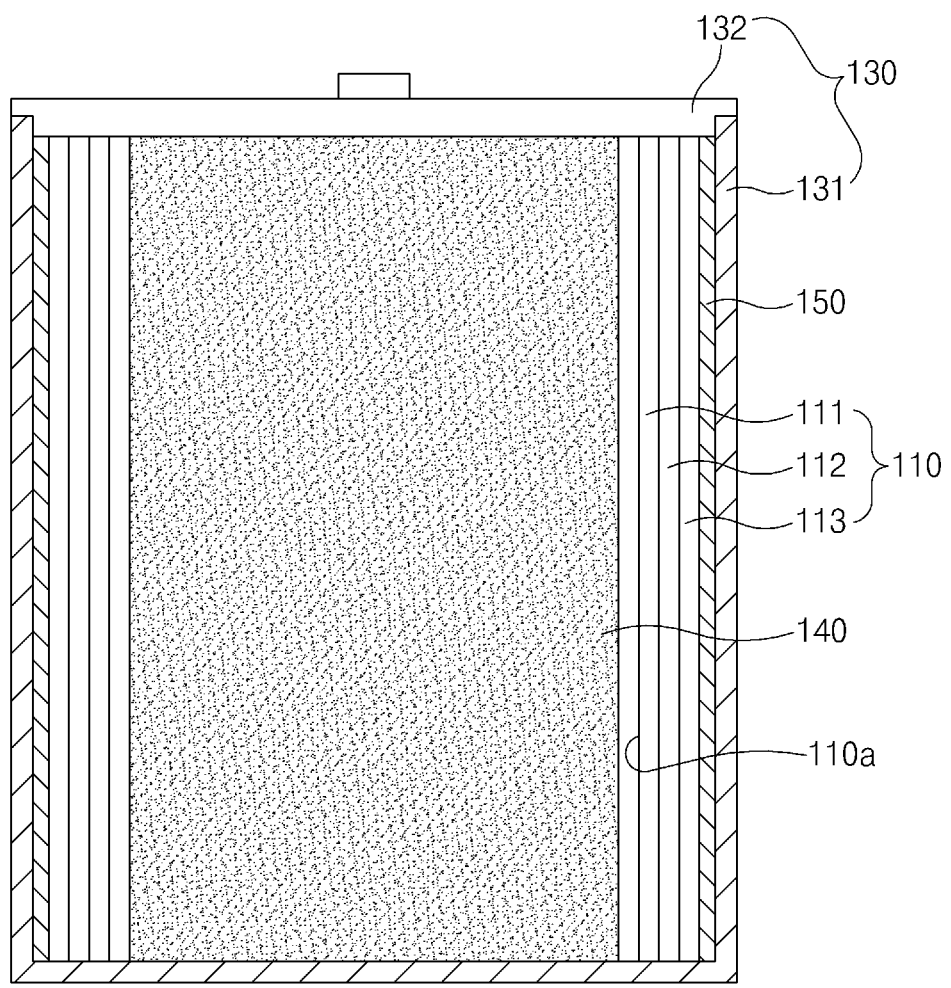
FIG. 3 is a plan view of the rechargeable battery according to the present invention.

Referring to FIGS. 1 to 3, the electrode assembly 110 is manufactured by winding a first electrode 111, a separator 112, and a second electrode 113 in a jelly-roll shape.

Here, the electrode assembly 110 is wound so that a cross-section thereof has an oval shape. Thus, a central space 110a has an oval shape is defined in a winding center of the electrode assembly 110, and the absorbing member 140 is provided in the central space 110a (see FIG. 4).

The first electrode 111 may be a negative electrode, the second electrode 113 may be a positive electrode, and vice versa.

The electrolyte 120 immerses the electrode assembly 110 therein. The electrolyte 120 together with the electrode assembly 110 may be accommodated in the case assembly 130.

Referring to FIG. 1, the case assembly 130 accommodates the electrode assembly 110 and the electrolyte 120. Particularly, the case assembly 130 may be provided as a prismatic type can assembly for accommodating the electrode assembly 110 having the oval shape.

That is, the case assembly 130 includes a prismatic type can 131 that accommodates the electrode assembly 110 and the electrolyte 120 and a can assembly 132 coupled to an opened upper portion of the can 131 to seal an opening of the can 131.

In the rechargeable battery according to the present invention, the electrode assembly 110 and the electrolyte 120 are accommodated in the case assembly 130. Then, the electrode assembly 110 may be charged and discharged and then be activated. Here, when the electrode assembly 110 is charged or discharged, stress may be applied to the inside and outside of the electrode assembly 110 while the electrode assembly 110 is expanded in volume.

Although the stress applied to the outside of the electrode assembly 110 is expandable while pushing the can 131, the stress applied to the inside of the electrode assembly 110 may generate twist of the electrode assembly 110 due to no space. As a result, the rechargeable battery may be deteriorated in performance.

To solve the foregoing limitation, the rechargeable battery according to the present invention may include the absorbing member 140 in the electrode assembly 110. The absorbing member 140 may absorb the stress applied to the inside of the electrode assembly 110 when the electrode assembly 110 is expanded to prevent the electrode assembly 110 from being twisted and also prevent the rechargeable battery from being deteriorated in performance.

Here, the absorbing member 140 may be formed of a material that absorbs the electrolyte 120 and thus is swelled. For example, the absorbing member 140 may be a swelling tape. The swelling tape may absorb the electrolyte 120 to absorb the stress applied to the inside of the electrode assembly 110 while being swelled.

The swelling tape may be called a swellable tape, i.e., a tape that has a felt shape and is swelled when contacting moisture to prevent the moisture from being permeated.

That is, referring to FIGS. 2 and 3, the absorbing member 140 that is the swelling tape includes a base layer 141 that is deformable in a longitudinal direction when contacting the electrolyte 120 and an adhesion layer 142 disposed on one surface of the base layer 141. Thus, the absorbing member 140 may absorb the electrolyte 120 through the base layer 141 and be swelled and also be attached to a planar portion in the central space 110a of the electrode assembly 110 through the adhesion layer 142. Also, the base layer 141 may include at least one of a urethane-bonded compound, an ester-bonded compound, an ether-bonded compound, a cellulose ester compound to improve swelling performance of the base layer 141.

Here, when the electrode assembly is wound, the electrode assembly 110 may sufficiently secure the central space 110a so that the absorbing member 140 is stably swelled to prevent the electrodes or the separator from being damaged by the swelled absorbing member 140.

Also, a portion of the electrolyte 120 accommodated in the case assembly 130 may be absorbed into the absorbing member 140 to cause a variation in capacity of the electrolyte 120. Thus, when the case assembly 130 is sealed, the electrolyte 120 may be supplemented after the variation in capacity of the electrolyte 120 is confirmed.

The absorbing member 140 that is provided as the swelling tape may have a size less than that of the central space 110a. That is, since the absorbing member 140 that is provided as the swelling tape increases in length and width while absorbing the electrolyte 120, the absorbing member 140 may have a size less than that of the central space 110a in consideration of the increase in size of the absorbing member 140.

Alternatively, the absorbing member 140 that is provided as the swelling tape may have the same size as the central space 110a. That is, when the electrode assembly 110 has a small size, the absorbing member 140 that is provided as the swelling tap may also be manufactured with a small size. Thus, since the absorbing member 140 does not increase in swelling, the absorbing member 140 may have the same size as the central space 110a.

As described above, since the absorbing member 140 that is provide as the swelling tape absorbs the electrolyte 120 and then be swelled, the absorbing member 140 may be convenient for use. Also, the absorbing member 140 may stably absorb the stress applied to the inside of the electrode assembly 110 to prevent the electrode assembly 110 from being twisted.

The rechargeable battery according to the present invention may include a sealing tape 150 disposed on an outer circumferential surface of the electrode assembly 110. That is, the sealing tape 150 may be provided in a shape that surrounds the outer circumferential surface of the electrode assembly 110 to fix an outer appearance of the electrode assembly 110.

The sealing tape 150 may be formed of a material that absorbs the stress applied to the outside of the electrode assembly 110 to prevent the case assembly 130 from being pushed out, i.e., deformed by the electrode assembly 110 when the electrode assembly 110 is expanded.

For example, the sealing tape 150 may be formed a material that absorbs the electrolyte 120 and thus is swelled. That is, the sealing tape 150 may be a swelling tape that has the same as the absorbing member 140. Thus, the sealing tape 150 together with the electrode assembly 110 may be accommodated in the case assembly 130, like the absorbing member 140. Here, the sealing tape 150 may be swelled while absorbing the electrolyte 120. Also, when the electrode assembly 110 is charged or discharged, the sealing tape 150 may absorb the stress applied to the outside of the electrode assembly 110 to prevent the rechargeable battery from being deteriorated in performance and prevent the case assembly 130 from being deformed in outer appearance.

Hereinafter, a method for manufacturing the rechargeable battery according to the present invention will be described in detail with reference to the accompanying drawings.

Figure 4:
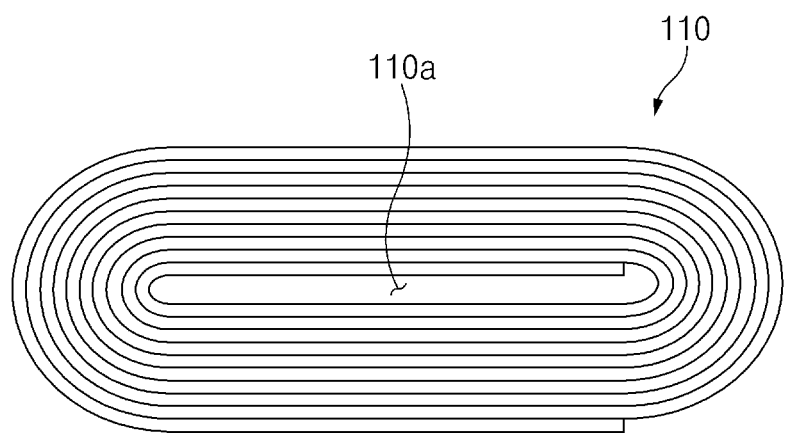

As illustrated in FIG. 4, a first electrode 111, a separator 112, and a second electrode 113, each of which has a sheet shape, are stacked and then wound in a jelly-roll shape to manufacture an electrode assembly 110. Here, when the electrode assembly 110 is wound, a predetermined central space 110a is formed in a winding center of the electrode assembly 110.

Figure 5:
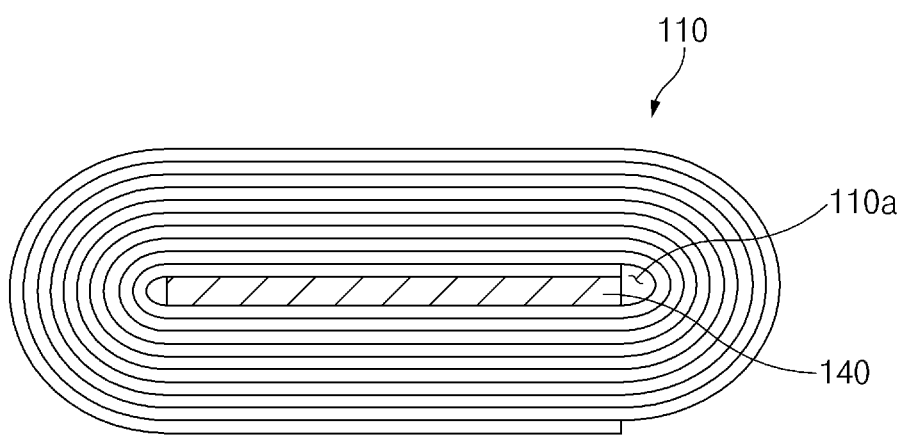

Then, as illustrated in FIG. 5, an absorbing member 140 that is a swelling tape is attached on one surface of the central space 110a of the electrode assembly 110. Here, the absorbing member 140 has a size that is equal to or less than that of the central space 110a.

Figure 6:
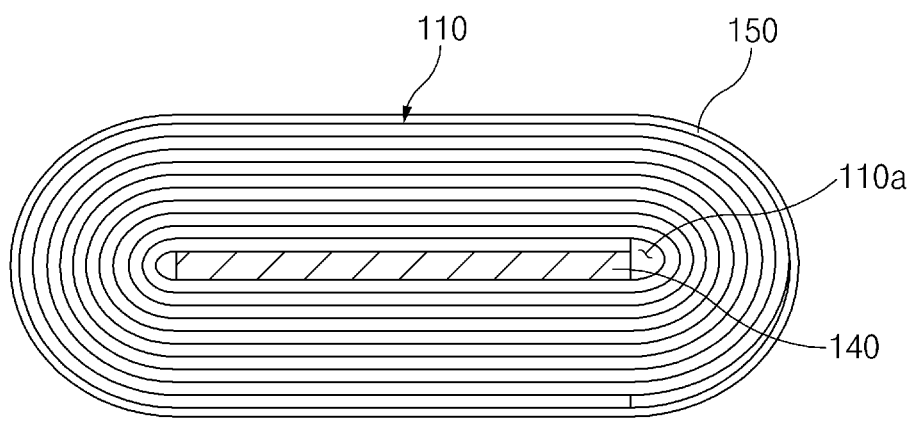
Figure 7:
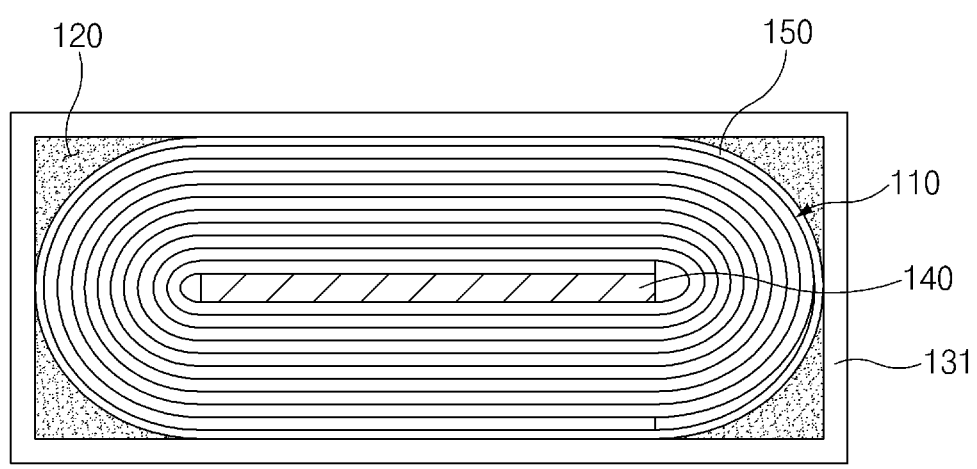

Then, as illustrated in FIG. 6, a sealing tape 150 formed of a swellable material is attached to an outer surface of the electrode assembly 110.

Then, the electrode assembly 110, to which the absorbing member 140 and the sealing tape 150 are attached, together with an electrolyte 120 may be accommodated into a case assembly 130 to complete the manufacturing of the rechargeable battery. Here, the absorbing member 140 and the sealing tape 150 may be swelled while absorbing the electrolyte 120.

Figure 8:
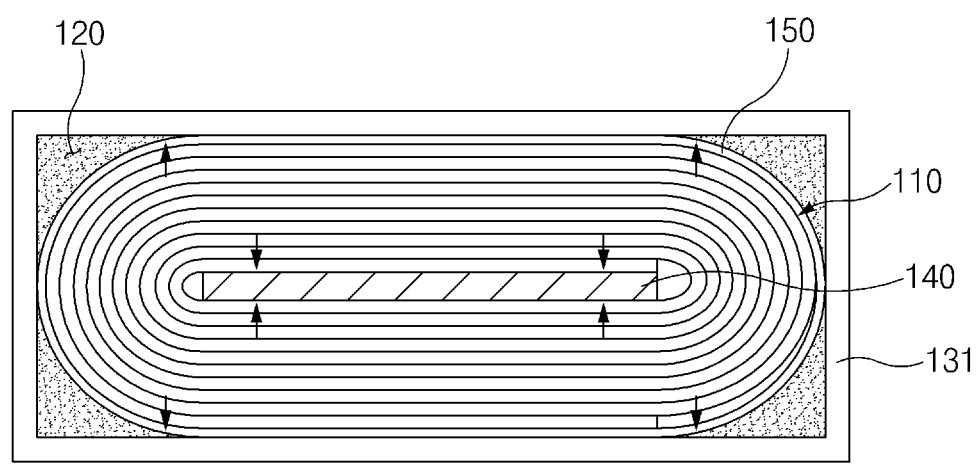

As described above, the completed rechargeable battery may be changed and discharged for activation as illustrated in FIG. 8. Here, when the electrode assembly 110 is charged and discharged, stress may be applied to the inside and outside of the electrode assembly 110 while the electrode assembly 110 is expanded. Here, the stress applied to the outside of the electrode assembly 110 may be absorbed by the sealing tape 150, and the stress applied to the inside of the electrode assembly 110 may be absorbed by the absorbing member 140 to prevent the electrode assembly 110 from being twisted, thereby preventing the rechargeable battery from being deteriorated in performance.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A rechargeable battery comprising:
an electrode assembly;
an electrolyte immersing the electrode assembly therein;
a case assembly accommodating the electrode assembly and the electrolyte;
an absorbing member disposed in an interior of the electrode assembly to absorb stress applied to the inside of the electrode assembly when the electrode assembly is expanded; and
a sealing tape disposed on an outer circumferential surface of the electrode assembly,
wherein the absorbing member is formed of a material that absorbs the electrolyte and is swelled,
wherein the absorbing member comprises a base layer deformed in a longitudinal direction when contacting the electrolyte and an adhesion layer attached to a planar portion of the electrode assembly in a central space of the electrode assembly and disposed on one surface of the base layer such that the one surface of the base layer and the planar portion of the electrode assembly are parallel to each other,
wherein the base layer comprises at least one of a urethane-bonded compound or a cellulose ester compound,
wherein the absorbing member is disposed in a winding center of the electrode assembly that is manufactured by winding a first electrode, a separator, and a second electrode in a jelly-roll shape,
wherein the electrode assembly has a cross-section having an oval shape to define the central space as having an oval shape in the winding center, and
wherein the absorbing member is attached to the central space.

2. The rechargeable battery of claim 1, wherein the absorbing member comprises a swelling tape, and
the swelling tape absorbs the stress applied to the inside of the electrode assembly.

3. The rechargeable battery of claim 1, wherein the absorbing member has a size that is less than or equal to that of the central space.

4. The rechargeable battery of claim 1, wherein the sealing tape is formed of a material that absorbs the electrolyte and is swelled.

5. The rechargeable battery of claim 1, wherein the case assembly is provided as a prismatic type can assembly.

\* \* \* \* \*